(12) United States Patent
Choi et al.

(10) Patent No.: US 7,626,503 B2
(45) Date of Patent: Dec. 1, 2009

(54) BI-SLOT TREE BASED TAG IDENTIFICATION METHOD IN RFID SYSTEMS

(75) Inventors: Ji Hwan Choi, Seoul (KR); Hyuckjae Lee, Daejeon (KR); Dongwook Lee, Gyeongsangbuk-do (KR); Hyoungsuk Jeon, Seoul (KR); Hoiyoon Jung, Seoul (KR)

(73) Assignee: Research and Industrial Cooperation Group, Daejeon (KR)

( * ) Notice: Subject to any disclaimer, the term of this patent is extended or adjusted under 35 U.S.C. 154(b) by 260 days.

(21) Appl. No.: 11/641,835

(22) Filed: Dec. 20, 2006

(65) Prior Publication Data

US 2008/0106382 A1 May 8, 2008

(30) Foreign Application Priority Data

Oct. 19, 2006 (KR) .................. 10-2006-0101996

(51) Int. Cl.
*G08B 13/14* (2006.01)
(52) U.S. Cl. .................. 340/572.1; 34/568.1; 34/10.1; 34/539.1
(58) Field of Classification Search ... 340/572.1–572.9, 340/568.1, 10.1, 10.3, 825, 825.69, 539.1, 340/539.11, 539.13
See application file for complete search history.

(56) References Cited

U.S. PATENT DOCUMENTS

| | | | |
|---|---|---|---|
| 5,339,073 A | | 8/1994 | Dodd et al. |
| 6,727,803 B2 * | | 4/2004 | Hulvey ................ 340/10.31 |
| 6,967,564 B2 * | | 11/2005 | Hulvey ................ 340/10.31 |
| 7,009,526 B2 * | | 3/2006 | Hughes et al. ......... 340/825.49 |
| 7,075,436 B2 * | | 7/2006 | Shanks et al. ........... 340/572.1 |
| 2003/0137403 A1 | | 7/2003 | Carrender et al. |
| 2005/0024186 A1 * | | 2/2005 | Friedrich ............... 340/10.31 |
| 2006/0273881 A1 * | | 12/2006 | Yang et al. ............... 340/10.2 |
| 2007/0075836 A1 * | | 4/2007 | Lieffort et al. ............ 340/10.1 |

* cited by examiner

*Primary Examiner*—Daniel Previl
(74) *Attorney, Agent, or Firm*—Bacon & Thomas, PLLC

(57) ABSTRACT

A bi-slot tree based tag identification method in RFID systems includes (a) transmitting an inquiry of (n−1) bits to each tag at the reader; (b) deciding whether the inquiry of (n−1) bits are identical with first (n−1) bits of each tag ID when receiving the inquiry of (n−1) bits at each tag within a readable range of the reader; (c) transmitting each tag ID by one bit from $(n+1)_{th}$ bit to last bit thereof to the reader through different time slots based on $n_{th}$ bit value of each tag ID at the tags whose first (n−1) bits are identical with the inquiry of (n−1) bits; and (d) at the reader, checking whether there is a collision among the tag IDs received from the tags and identifying each tag ID of the tags based on the check result.

11 Claims, 11 Drawing Sheets

BI-SLOT TREE BASED TAG IDENTIFICATION METHOD IN RFID SYSTEMS

FIELD OF THE INVENTION

The present invention relates to a tag identification method in RFID systems; and, more particularly, to a bi-slot tree based tag identification method in the RFID systems capable of reducing the reader's inquiries.

BACKGROUND OF THE INVENTION

As well known, RFID (Radio Frequency Identification) is one of automatic identification methods such as a barcode, a magnetic sensor, an IC card and the like; and means a technology used for wirelessly identifying data stored in a tag's microchip by using an ultra-short wave or a long wave.

Such RFID is regarded as a substitute technology for the barcode which is currently used in distribution and circulation fields and financial services. The RFID has advantages in that there is no need of an extra identification process such as contact required in a conventional barcode method in order to achieve tag information or a reader scan in a visibility range and in that huge amounts of data can be sent.

However, since the RFID has problems with the reliability of the identified data and the delay of the technology standardization, researches on anti-collision protocols have been required to improve the characteristics of a read rate and an identification speed.

Meanwhile, there are generally two types of collisions: reader collisions and tag collisions. The reader collisions indicate that a plurality of readers requests inquiries to one tag concurrently, so it is confusing for the tag to identify the inquiries. On the contrary, the tag collisions indicate that a plurality of the tags responds to one reader's inquiry simultaneously and therefore the reader cannot identify any tag. The reader collisions can be easily solved because the readers in RFID systems detect the collisions and communicate with other readers, and therefore, the anti-collision protocols in the existing Mac layers are easily applicable to such situation. However, in case of the tag collisions, the tags which are currently used or which will be used in the large scale distribution and circulation fields are low-cost passive tags, resulting in some restrictions such as complexity of calculating, battery absence and cost increase by the memory size when applying usable anti-collision protocols thereto.

RFID tag anti-collision protocols proposed up to now to solve the tag collisions can be grouped into deterministic methods and probabilistic methods. The deterministic methods, which are on the basis of tree based protocols, guarantee a 100% read rate and enable low-power consumption. The tree based protocols identify tags by constructing binary trees through the use of binary bits of tag IDs and then by circulating the nodes of the trees. The tree based protocols have the characteristics capable of predicting the tag identification process. Further, the tags in the tree based protocols simultaneously start transmission with synchronous timing, and, on the other hand, the readers recognize the case that both '0' and '1' are included in the received values as a collision and then split the trees.

Such deterministic methods can be classified into a memory based algorithm and a memoryless based algorithm. In the memory based algorithm, which can be grouped into a splitting tree algorithm and a bit-arbitration algorithm, the reader's inquiries and the responses of the tags are stored and managed in the tag memory, thereby causing an equipment cost increase.

In contrast, in the memoryless based algorithm, the responses of the tags are not determined by the reader's previous inquiries, the tags' responses and the reader's present inquiries, but determined only by the present reader's inquiries so that the cost for the tags can be minimized. As an example, there are a binary tree working algorithm, a query tree algorithm and a collision tracking tree algorithm.

Meanwhile, the probabilistic methods are based on slotted aloha based protocols which do not guarantee a 100% read rate but reduce the probability of tag collisions occurring. To improve the performance, there has been suggested a frame slotted aloha based anti-collision algorithm wherein frames, each being formed of predetermined N slots, are used for the communications between the readers and the tags; and each tag in the interrogation zone arbitrarily selects a slot for transmitting the tag's information and loads the corresponding IDs therein.

In this algorithm, it is regarded as a collision that several tags select one slot and load each ID therein to send concurrently, but the rate of duplicated selection can be reduced by increasing the slots. However, the increase of the slots in each frame causes the increase of frame transmitting time. In spite of this contradiction, it is difficult to calculate the number of the identification objects, i.e., tags, accurately, so the appropriate number of slots required to each frame and the end point are calculated depending on the probabilistic methods. Thus, the ALOHA based anti-collision algorithm has problems in that it cannot provide the complete tag identification; and high efficiency in the tag identification cannot be expected because the slots where collisions occurred are retransmitted.

The probabilistic methods can be classified into an ID-slot algorithm and a bit-slot algorithm. The ID-slot algorithm transmits each slot where the tag ID is loaded, whereas the Bit-slot algorithm transmits each slot where the information composed of specific bits for each tag is loaded to the reader and sequentially responds pursuant to the reader's call. As a representative algorithm of the ID-slot algorithm, there is an I-code algorithm, while there is an anti-collision algorithm using a bit-slot mechanism as the bit-slot algorithm.

According to the suggestion of EPC global, the binary tree working algorithm is adopted in Class 0, the query tree algorithm is adopted in Class 1, the deterministic frame slotted aloha algorithm is adopted in Class 1 Gen. 2 proposed to ISO/IEC 18000-6C of the International Standard organization, and the deterministic frame slotted aloha algorithm being formed by adding advantages of the bit-slot algorithm to the frame slotted aloha based anti-collision algorithm.

The performance of these deterministic methods has been improved from the binary tree working algorithm to the query tree algorithm and from the query tree algorithm to the collision detection algorithm. Moreover, the improvement of the algorithm for the performance enhancement is focused on how to manage the responses of the tags. In other words, in order to improve the performance of the binary tree working algorithm where only $(k+1)_{th}$ bit of the tag ID responds to the reader's inquiry of k bits, the query tree algorithm make the $(k+1)_{th}$ bit to the end bit of the tag ID respond to the reader's inquiry so one tag ID can be identified directly if there is no collision.

Furthermore, if there is a collision in the query tree algorithm, the trees are split as in the binary tree working algorithm and retransmitted after increasing one bit to the inquiry, thereby causing the waste of the time. In order to reduce the waste of the time, in the collision detection algorithm, when the reader detects the collision while observing the responses of the tags, it transmits a signal to the tags to stop the transmission and puts the received signal into the inquiries to perform identification processes.

Although the performance can be enhanced by taking benefit while processing the responses of the tags according to such methods, the current researches focus on only half of the improvable part, but do not consider the performance which can be enhanced by focusing on the reader's inquiry. Accordingly, the present invention focuses on a method capable of reducing the reader's inquiries, not the tags' responses, thereby achieving performance enhancement.

SUMMARY OF THE INVENTION

It is, therefore, an object of the present invention to provide a bi-slot tree based tag identification method in the RFID systems which is capable of reducing the number of the inquiries and the responses between the reader and the tags by reducing the reader's inquiries without having influence on the tags' responses.

Another object of the present invention is to provide a bi-slot tree based tag identification method in the RFID systems capable of improving the identification performance of the tag by reducing the reader's inquiries without having influence on the tags' responses.

In accordance with a preferred embodiment of the present invention, there is provided a bi-slot tree based tag identification method in RFID systems including a reader and a plurality of tags, the method includes the steps of:

(a) transmitting an inquiry of (n−1) bits to each tag at the reader;

(b) deciding whether the inquiry of (n−1) bits are identical with first (n−1) bits of each tag ID when receiving the inquiry of (n−1) bits at each tag within a readable range of the reader;

(c) transmitting each tag ID by one bit from $(n+1)_{th}$ bit to last bit thereof to the reader through different time slots based on $n_{th}$ bit value of each tag ID at the tags whose first (n−1) bits are identical with the inquiry of (n−1) bits; and (d) at the reader, checking whether there is a collision among the tag IDs received from the tags and identifying each tag ID of the tags based on the check result.

In accordance with another embodiment of the present invention, there is provided a bi-slot tree based tag identification method in RFID systems including a reader and a plurality of tags, the method includes the steps of:

(a) transmitting an inquiry of (n−1) bits to each tag at the reader;

(b) deciding whether the inquiry of (n−1) bits are identical with first (n−1) bits of each tag ID when receiving the inquiry of (n−1) bits at each tag within a readable range of the reader;

(c) transmitting each tag ID by one bit from $(n+1)_{th}$ bit to a last bit to the reader through different time slots based on $n_{th}$ bit value of each tag ID at the tags each of which the first (n−1) bits are identical with the inquiry of (n−1) bits;

(d) at the reader, checking whether there is a collision in each bit received from each tag through the different time slots and, if there occurred a collision, transmitting an ACK signal to each tag while detecting the bit where the collision occurred, the ACK signal representing the occurrence of the collision; and (e) identifying each tag ID of the tags base on the detection.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings so that they can be readily implemented by those skilled in the art.

Figure 1:
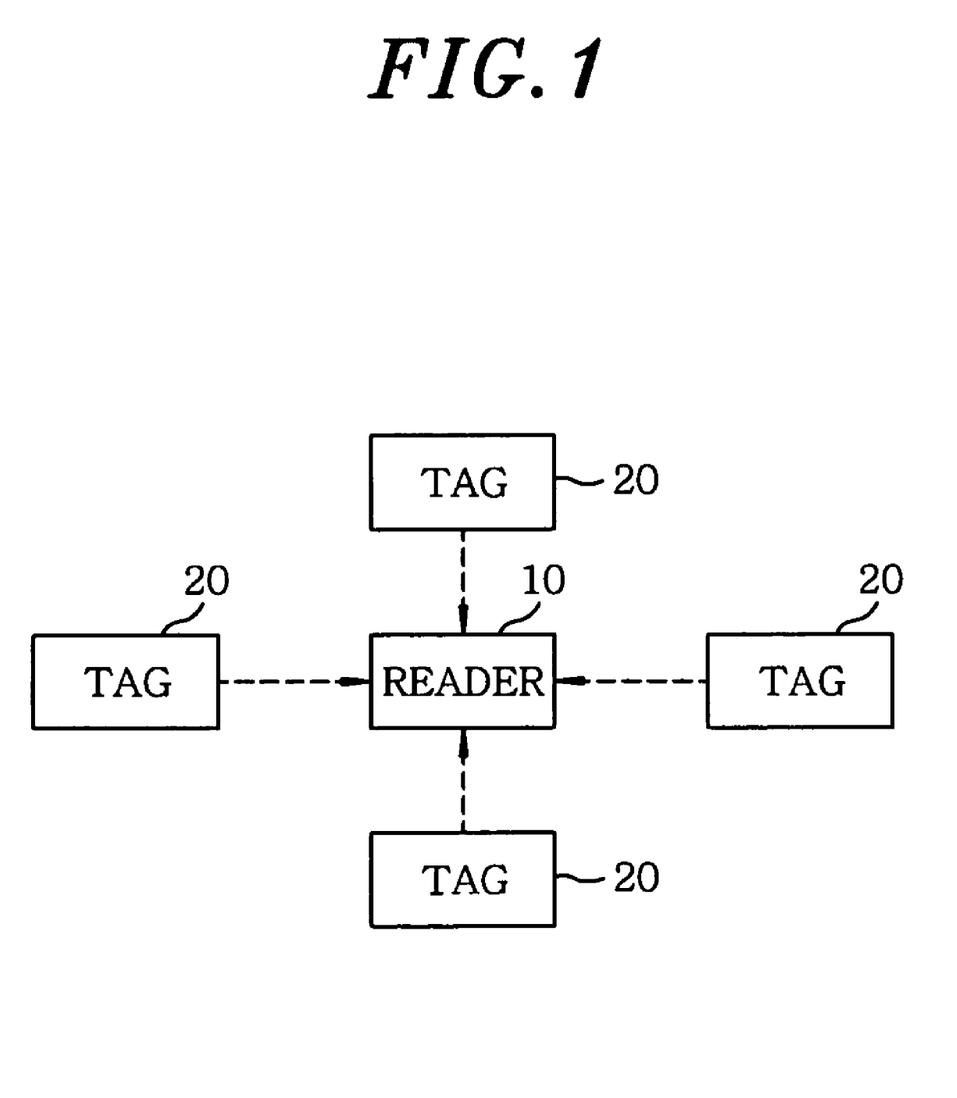
FIG. 1 shows a schematic diagram of a RFID system capable of implementing a scanning based tag identification method in accordance with the present invention.

FIG. 1 is a schematic diagram of a RFID system capable of implementing a scanning based tag identification method in accordance with the present invention.

As shown in FIG. 1, the RFID system where the tag identification method of the present invention is implemented includes a reader 10 and at least one tag 20. The RFID is a technology capable of reading information of tags through RF waves after attaching the tags to objects. This technology can be applied to various fields such as distribution management, security, circulation and the like. By changing an existing contact barcode into RF, it cannot only read the information faster than the barcode but also has the advantage that the restriction of the operation range is alleviated. Further, it takes an additional advantage of intelligentization of objects.

In ubiquitous computing environments, a large number of the tags 20 belong to one reader 10; and there inevitably occur collisions among the information of a plurality of the tags 20 due to synchronism and density thereof. That is, when there are several tags 20 within a readable range of one reader 10, the several tags 20 simultaneously respond to the call of the reader 10. At this time, signals of the several tags 20 are interfered with each other, resulting in collisions.

Therefore, it is required to provide a method for identifying the response of each tag without collisions by solving the interference among the responding signals of such tags 20, which is referred to as an anti-collision protocol (an anti-collision algorithm).

Figure 2A:
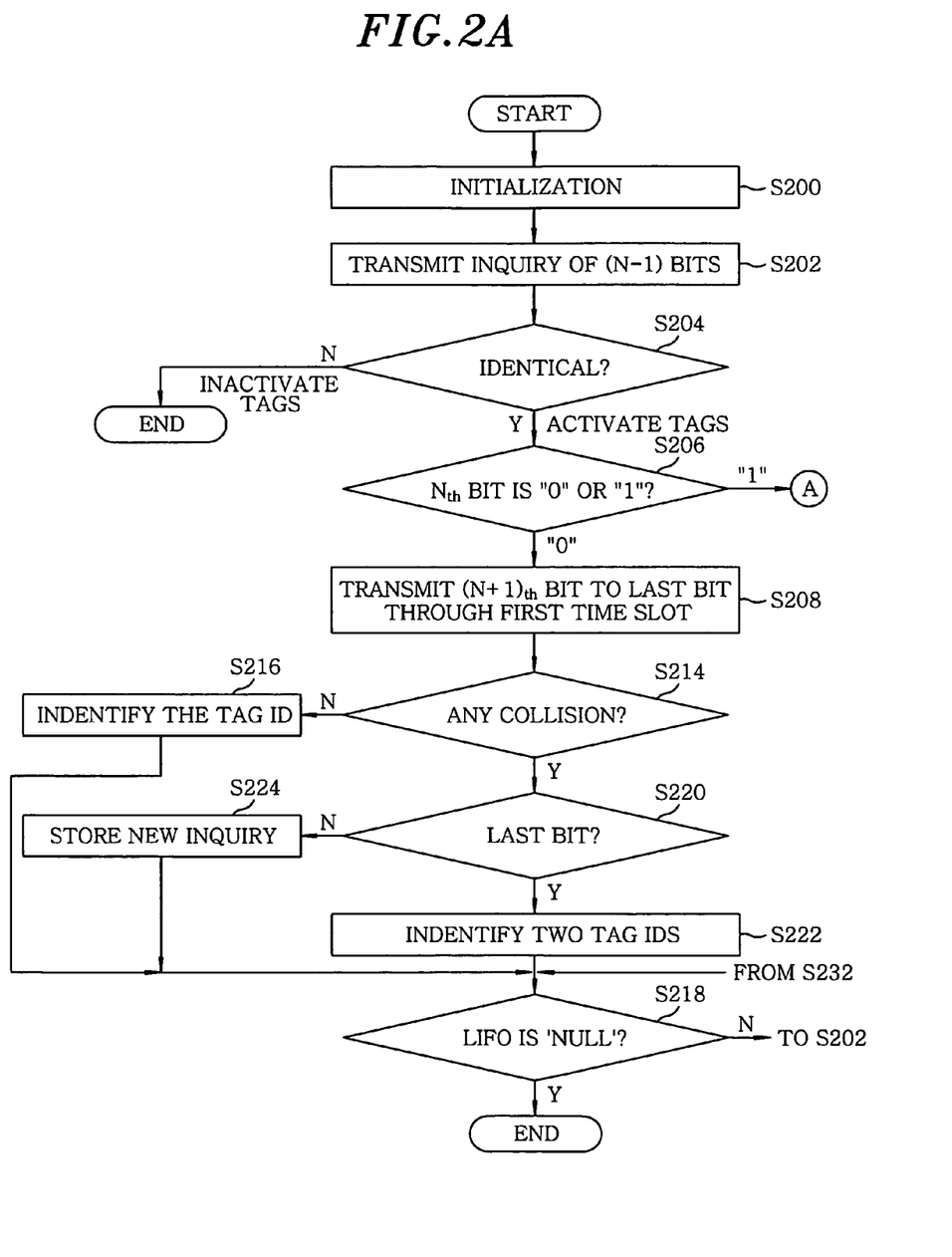
FIGS. 2A and 2B are flow charts for describing an anti-collision method based on a bi-slot query tree algorithm in accordance with the present invention.
Figure 2B:
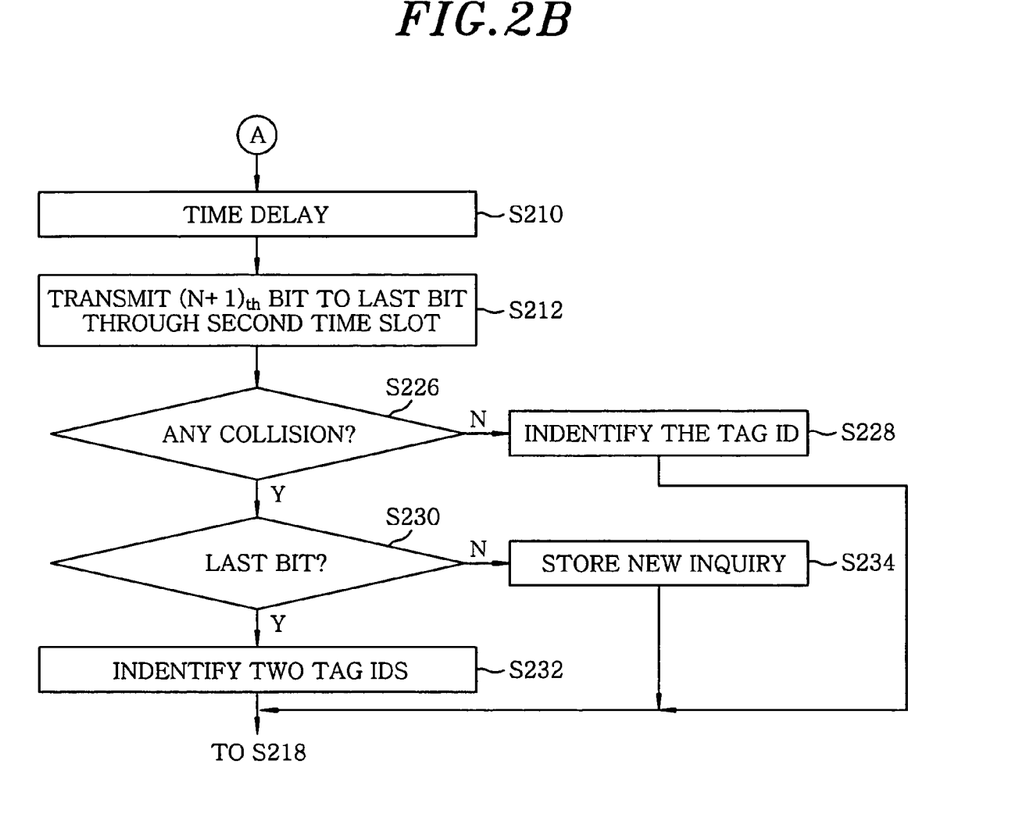

FIGS. 2A and 2B are flow charts for describing an anti-collision method based on a bi-slot query tree algorithm applied to the present invention.

Referring to FIG. 2A, first of all, the inventive system is initialized (step S200), and the reader 10 transmits an inquiry of (n−1) bits, i.e., from a first bit to a bit immediately before the tree depth, to the tags 20 (step S202). In response to the reader's inquiry, each of the tags 20 within a readable range of the reader 10 compare its first (n−1) bits of each tag ID with the inquiry to decide whether they are the same (step S204).

As a result of such comparison in step S204, each of the tags 20 whose first (n−1) bits are identical with the inquiry are activated to respond with its tag ID. Then, each tag 20 checks whether the $n_{th}$ bit value of each tag ID is '0' or '1' (step S206). However, each of the tags 20 whose the (n−1) bits are not identical with the reader's inquiry is inactived.

Based on the decision of the step S206, each of the tags 20 whose tag ID has the $n_{th}$ bit value of '0' transmit it tag ID by one bit from $(n+1)_{th}$ bit to a last bit to the reader 10 through a first time slot (step S208).

On the contrary, each of the tags 20 whose tag ID has $n_{th}$ bit value of '1' waits for a predetermined time, the predetermined time being represented as 'the length of each tag ID)−((n−1) bits)' (step S210), and then transmit its tag ID by one bit from $(n+1)_{th}$ bit to a last bit to the reader 10 through a second time slot (step S212).

The reader 10, whenever receiving each tag ID by one bit through each first time slot, detects whether there is any collision (step S214). If it is detected that there is no collision in the step S214, the reader 10 identifies one tag ID (step S216) and checks whether the state of a memory (not shown), for example, LIFO (Last Input First Output), is 'null' or not (step S218).

On the contrary, if it is detected that there is a collision in step S214, the reader 10 detects whether the bit where the collision occurred is the last bit from each tag 20 (step S220).

Depending on the result of the step S220, if the collision occurred in the last bit of each tag ID, the reader 10 identifies two tag IDs, each having a last bit of '1' or '0', on the basis of the uniqueness of the tag ID (step S222), and a control process proceeds to step S218.

However, if the collision occurred not in the last bit of each tag ID, the reader 10 produces new inquiry and stores it, which will be used for the next process, into the memory (step S224). The new inquiry is formed by the connection of the reader's inquiry and the bit indicated by the first time slot. And, a control process then proceeds to step S218.

Referring to FIG. 2B, on the other hand, the reader 10, whenever receiving each tag ID by one bit through each second time slot, detects whether or not there is any collision (step S226).

If it is detected that there is no collision in step S226, the reader 10 identifies one tag ID (step S228) and checks whether the state of the memory (not shown), for example, LIFO (Last Input First Output) is 'null' (step S218) in order to check whether there is any remaining tag IDs to be processed.

On the other hand, if it is decided that there is a collision in step S226, the reader 10 determines whether the bit where the collision occurred is the last bit of each tag ID transmitted from the tags 20 (step S230).

Depending on the result of step S230, if the collision occurred in the last bit of each tag ID, the reader 10 identifies two tag IDs having the last bit of '1' or '0', on the basis of the uniqueness of the tag ID (step S232). And a control process proceeds to step S218.

Otherwise, the reader 10 produces new inquiry, which will be used for the next process and is formed by the connection of the reader's inquiry and the bit indicated by the second time slot. The new inquiry is then stored into the memory (step S234), and a control process proceeds to step S218.

Further, based on the result of step S218, if the state of the memory of the reader 10 is null, the process is terminated. Otherwise, a control process goes back to the step S202 and repeatedly performed.

Figure 3A:
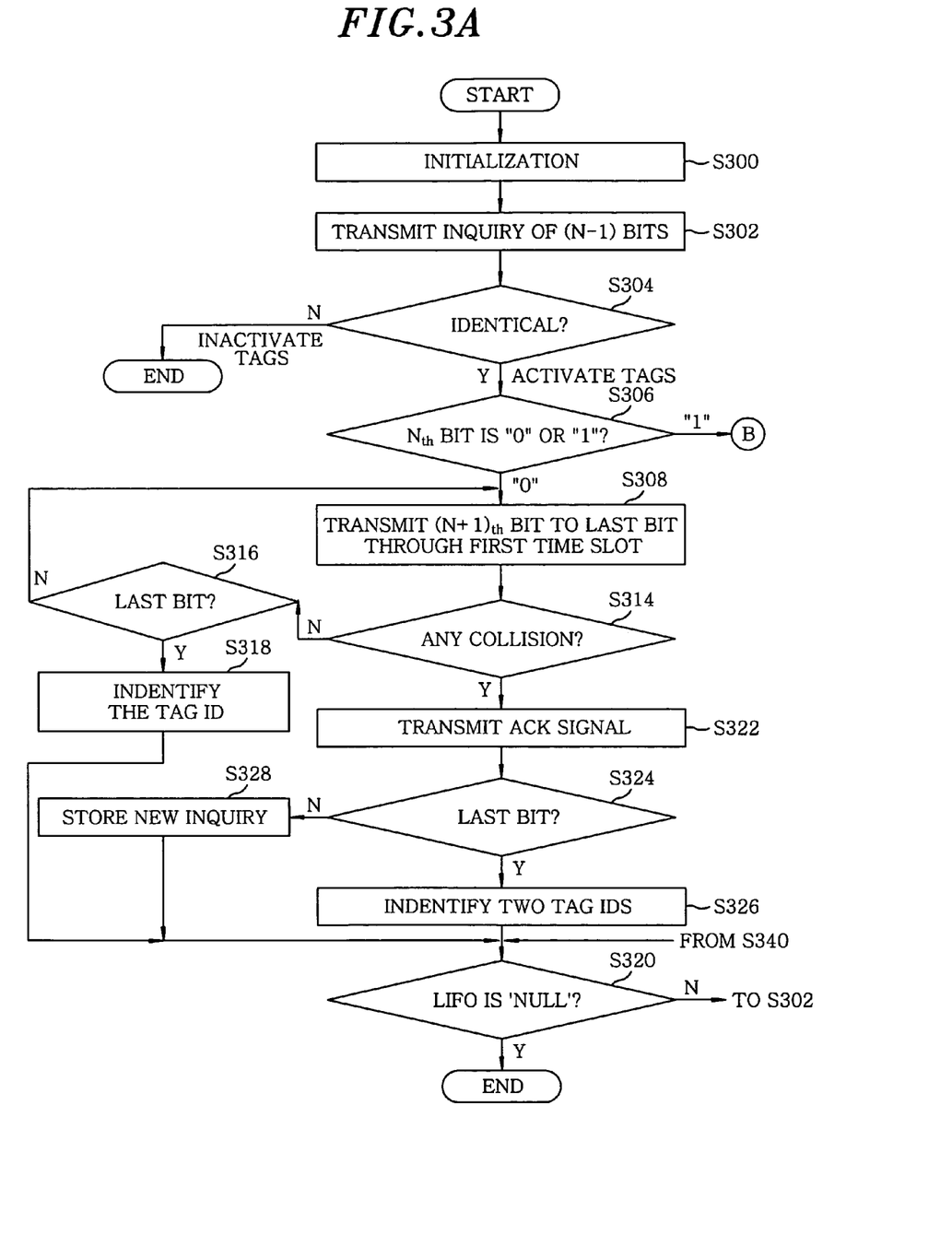
FIGS. 3A and 3B are flow charts for illustrating an anti-collision method based on a bi-slot collision detection method in accordance with the present invention.
Figure 3B:
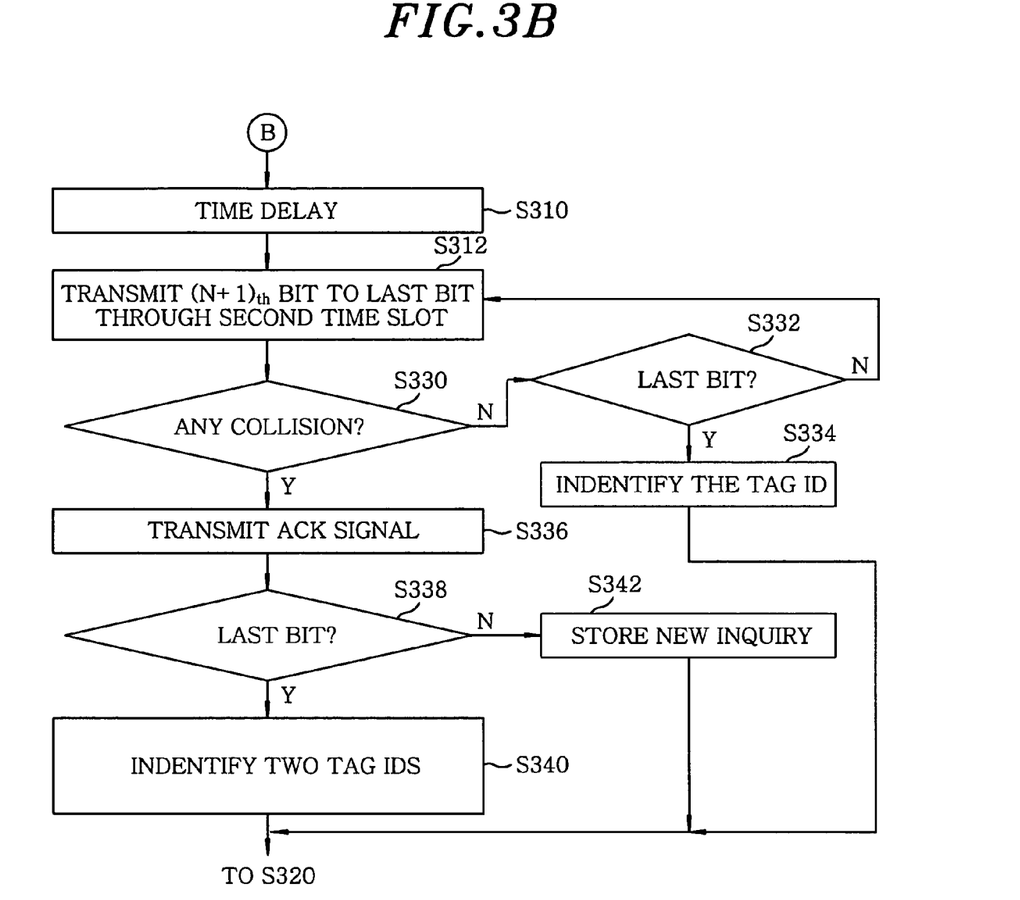

FIGS. 3A and 3B are flow charts for illustrating an anti-collision method based on a bi-slot collision detection method applied to the present invention;

Referring to FIG. 3A, after initialization (step S300), the reader 10 transmits an inquiry of (n−1) bits, i.e., from a first bit to a bit immediately before the tree depth, to the tags 20 (step S302). In response to the reader's inquiry, each of the tags 20 within a readable range of the reader 10 compare the inquiry of (n−1) bits with first (n−1) bits of its tag ID to decide whether they are identical with each other (step S304).

As a result of such comparison in step S304, the tags 20 whose first (n−1) bits are identical with the inquiry are activated and the activated tags respond with their tag IDs. If not, however, a control process is ended with the tags inactivated thereby.

Thereafter, each tag 20 checks whether the $n_{th}$ bit value of each tag ID is '0' or '1' (step S306).

According to the result of the step S306, each of the tags 20 whose tag ID has the $n_{th}$ bit value of '0' sequentially transmit each tag ID by one bit from $(n+1)_{th}$ bit to last bit to the reader 10 through a first time slot (step S308).

Whereas each of the tags 20 whose tag ID has the $n_{th}$ bit value of '1' waits until receiving an ACK signal from the reader (step S310, see FIG. 3B). Next, each of the tags 20 whose tag ID has the $n_{th}$ bit value of '1' transmit each tag ID by one bit from $(n+1)_{th}$ bit to last bit to the reader 10 through a second time slot (step S312, see FIG. 3B) if receiving the ACK signal.

Meanwhile, referring back to FIG. 3A, in step S314, the reader 10, whenever receiving each tag ID by one bit through each first time slot, detects whether there occurs any collision. If it is decided that there is no collision in step S314, the reader 10 detects that the received bit is the last bit of each tag ID (step S316).

As a result of step S316, in case of the last bit of each tag ID, the reader 10 identifies one tag ID, which is formed by the connection of the reader's inquiry, the bit indicated by the first time slot, and the tag's response (step S318). And the reader 10 checks whether the state of the memory (not shown), for example, LIFO (Last Input First Output) is 'null' (step S320).

On the other hand, according to the result of step S316, if the received bit is not the last bit of each tag ID, a control process proceeds to step S308 where the reader 10 receives next bit of each tag ID and then passes to next step.

Meanwhile, if it is decided that there is a collision in step S314, the reader 10 transmits the ACK signal representing the occurrence of the collision to the tags 20 (step S322). In response to the ACK signal, each tag having its $n_{th}$ bit value of '0' stops the transmission of its tag ID. Meanwhile, in response to the ACK signal, each of the tags 20 whose tag ID has the $n_{th}$ bit value of '1' begins to transmit its tag ID by one bit from $(n+1)_{th}$ bit to last bit to the reader 10.

Thereafter, the reader 10 determines whether the bit where the collision occurred is the last bit of each tag ID transmitted from the tags 20 (step S324).

Further, as a result of step S324, if the collision occurred in the last bit of each tag ID, the reader 10 identifies two tag IDs, each having its last bit of '0' or '1', on the basis of the uniqueness of the tag ID (step S326). And a control process proceeds to step S320.

Otherwise, the reader 10 produces new inquiry, which will be used for the next process, and stores it into the reader's memory, wherein the new inquiry is formed by the connection of the inquiry bits of the reader 10, the bit indicated by the first time slot, and the bit received before the collision (step S328), and then a control process proceeds to step S320.

Referring now to FIG. 3B, in step S330, the reader 10, whenever receiving each tag ID by one bit through each second time slot, determines whether there is any collision. If it is determined that there is no collision in step S330, the reader 10 detects whether the received bit is the last bit of each tag ID (step S332).

Depending on the result of step S332, in case of the last bit of each tag ID, the reader 10 identifies one tag ID, which is formed by the connection of the reader's inquiry, the bit indicated by the second time slot, and the tag's response (step S334) and proceeds to step S320 to check whether the state of the memory (not shown), for example, LIFO (Last Input First Output) is 'null'.

On the other hand, according to the result of step S332, if received bit is not the last bit of each tag ID, a control process proceeds to step S318 where the reader 10 receives a next bit of each tag ID from each tag whose the tag ID has $n_{th}$ bit value of '1' and then goes to next step.

Meanwhile, if it is decided that there occurs a collision in step S330, the reader 10 transmits the ACK signal indicating the occurrence of the collision to the tags 20 (step S336). Thereafter, the reader 10 determines whether a bit where the collision occurred is a last bit of each tag ID transmitted from each tag 20 (step S338).

Further, as a result of the step S338, if the collision occurred in the last bit of each tag ID, the reader 10 identifies two tag IDs, i.e., the connection of the reader's inquiry, the bit indicated by the second time slot, and the bits received before receiving the last bit, and '0' or '1', on the basis of the uniqueness of the tag ID (step S340), and a control process proceeds to step S320.

Otherwise, if the collision occurred is not in the last bit of each tag ID, the reader 10 produces a new inquiry and stores it into the memory (step S342), wherein the new inquiry is formed by the connection of the inquiry bits of the reader 10, the bit indicated by the second time slot and the bits received before the collision, and a control process proceeds to step S320.

Further, depending on the result of step S320, if the state of the LIFO is null, the control process is terminated. Otherwise, the control process returns back to the step S302 and is repeatedly performed again.

Consequently, through the processes described above, the reader 10 identifies all tags by the bi-slot query tree method and the bi-slot collision detection method; and thus it is possible to reduce the burden to the queries of the conventional query tree algorithm and collision detection algorithm.

Figure 4:
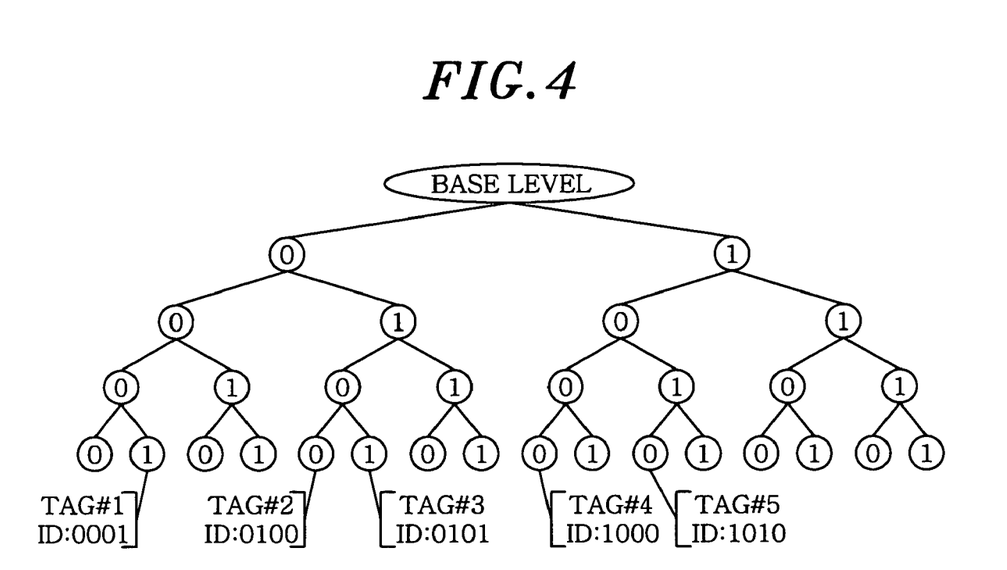
FIG. 4 shows an example of tags for describing the present invention.
Figure 5A:
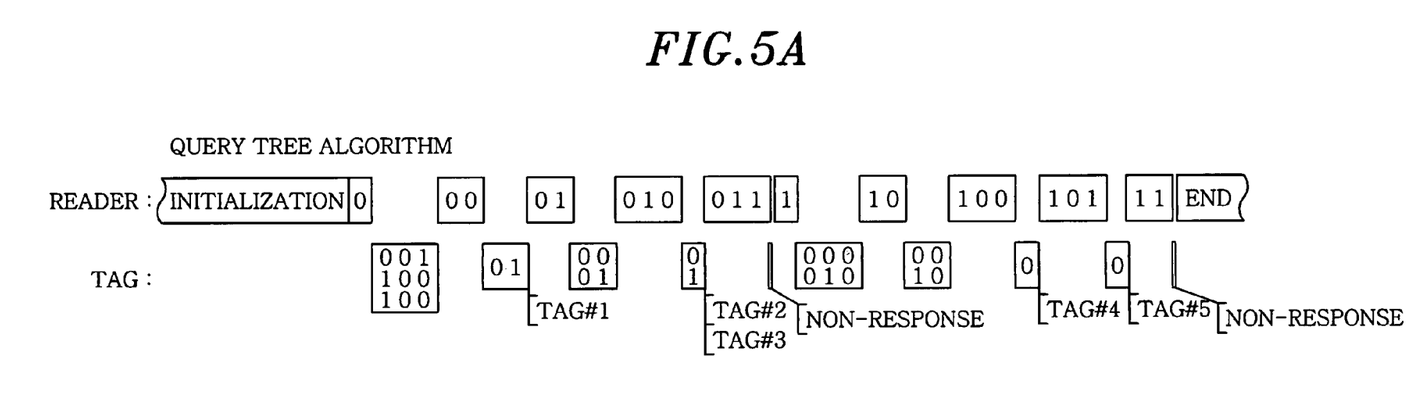
FIG. 5 shows comparison between a query tree algorithm and a bi-slot query tree algorithm for better understanding of the present invention.
Figure 5B:
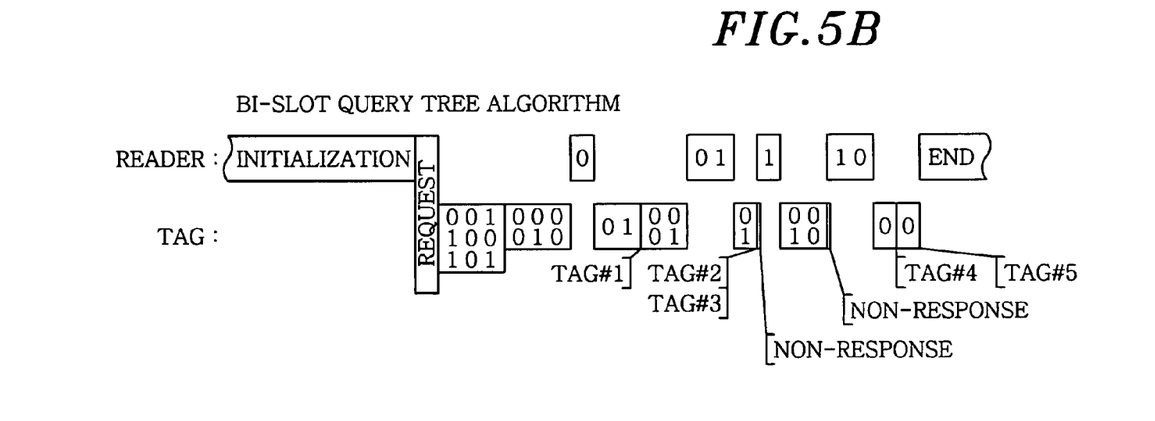

FIG. 4 shows an example of tags for describing the present invention. FIG. 5 shows comparison between a query tree algorithm and a bi-slot query tree algorithm for better understanding of the present invention, while FIG. 6 shows comparison between a collision detection algorithm and a bi-slot collision detection algorithm for better understanding of the present invention.

Figure 6A:
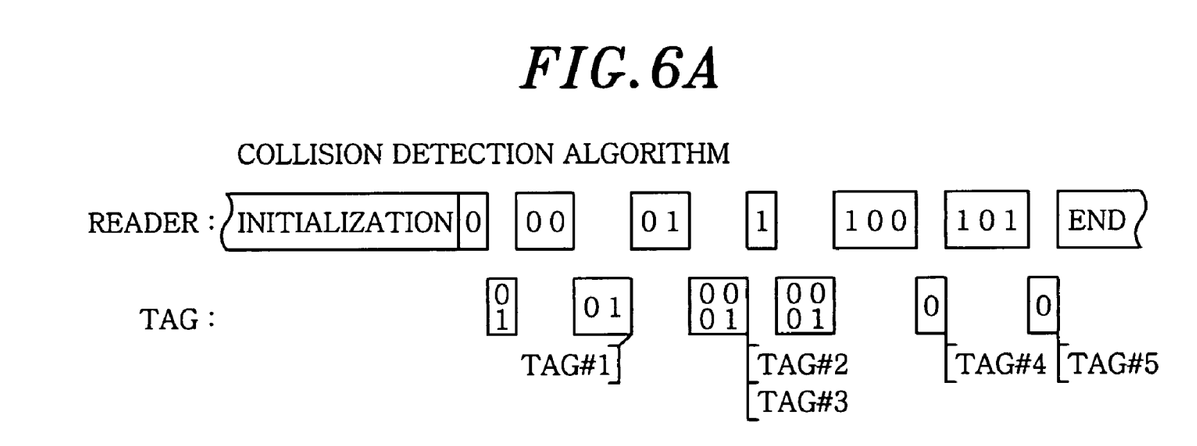
FIG. 6 shows comparison between a collision detection algorithm and a bi-slot collision detection algorithm for better understanding of the present invention.
Figure 6B:
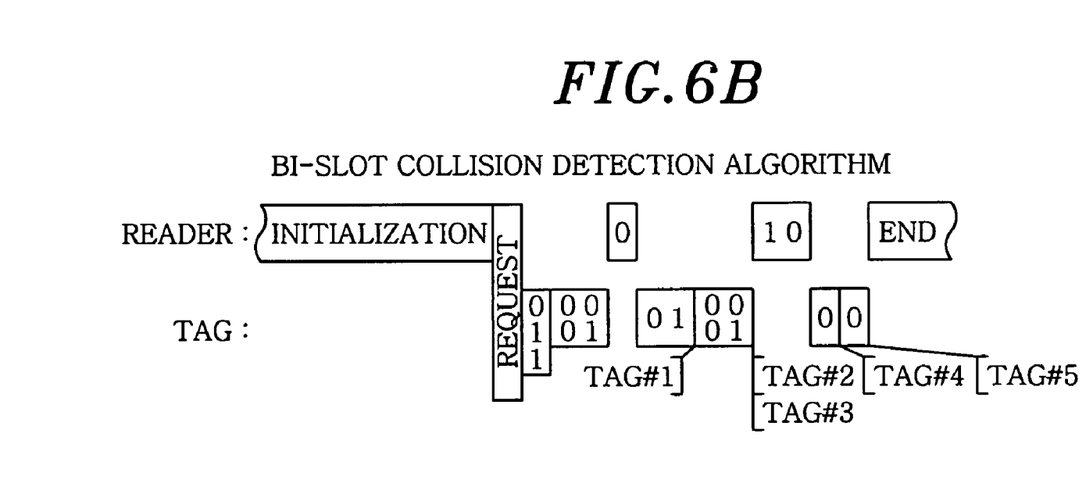

If it is assumed that there are five tags 20 each of which has an tag ID such as '0001', '0100', '1000', '0101' and '1010' (see FIG. 4), the five tags 20 are identified through the processes shown FIGS. 5 and 6 according to the conventional method and the method proposed in the present invention. Here, the inquiries of the reader and the responses of the tags for the inquiries with the lapse of the time are shown from left to right, while the size of each time slot is proportional to the number of the bits loaded in the time slot.

That is, it is noted that a method having a shorter total time slot is more efficient for identifying the same number of tags. For example, as shown FIG. 5, in order to identify five tags 20, total 37 bits including 22 bits for the reader's inquiries and 15 bits for the tags' responses are required in the conventional query tree method. In contrast, 7 bits for the reader's inquiries and 15 bits for the tags' responses, i.e., total 22 bits, are required in the bi-slot query tree method of the present invention.

Further, as described in FIG. 6, 12 bits for the reader's inquiries and 9 bits for the tags' responses, i.e., total 21 bits, are required in the conventional collision detection method, whereas total 13 bits including 4 bits for the reader's inquiries and 9 bits for the tags' responses are required in the bi-slot collision detection method of the present invention.

Accordingly, in accordance with the present invention, it is possible to reduce the burden of the reader's inquiries without influencing on the burden of the tags' responses and, furthermore, it is also possible to shorten the time for identifying the tags in comparison to the conventional method.

Figure 7:
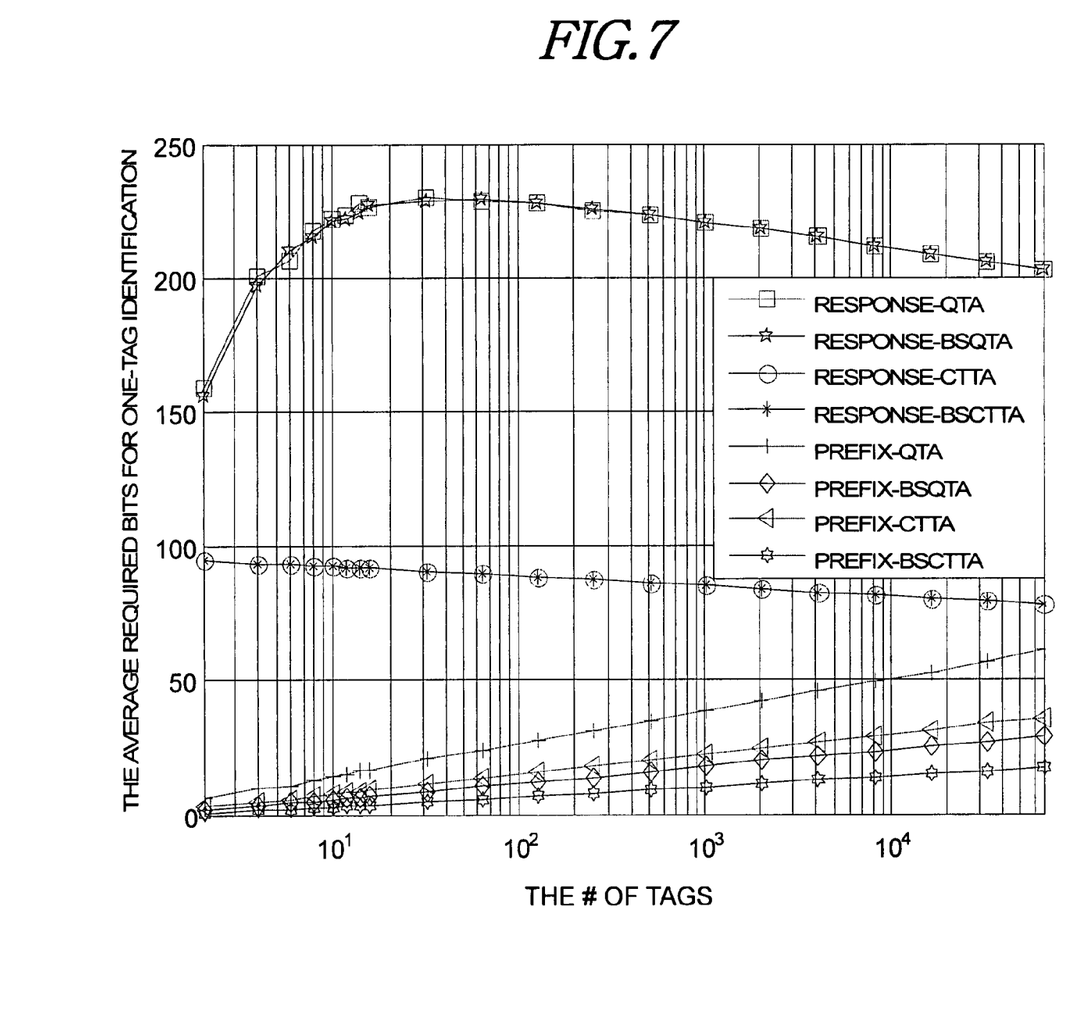
FIGS. 7 and 8 respectively describe the average required bits and iteration for the inquiry and the response of the reader and the tag in case of identifying one tag which has a 96-bit ID in accordance with the present invention.
Figure 8:
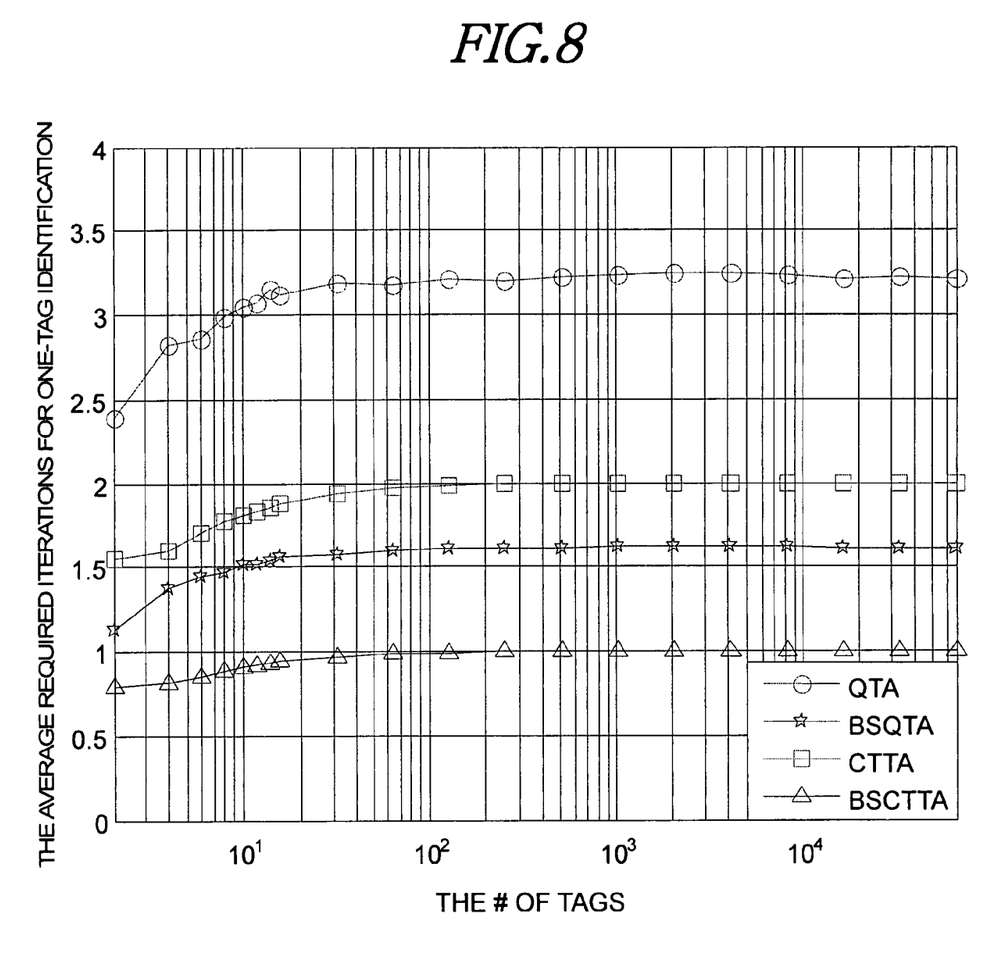
Figure 9:
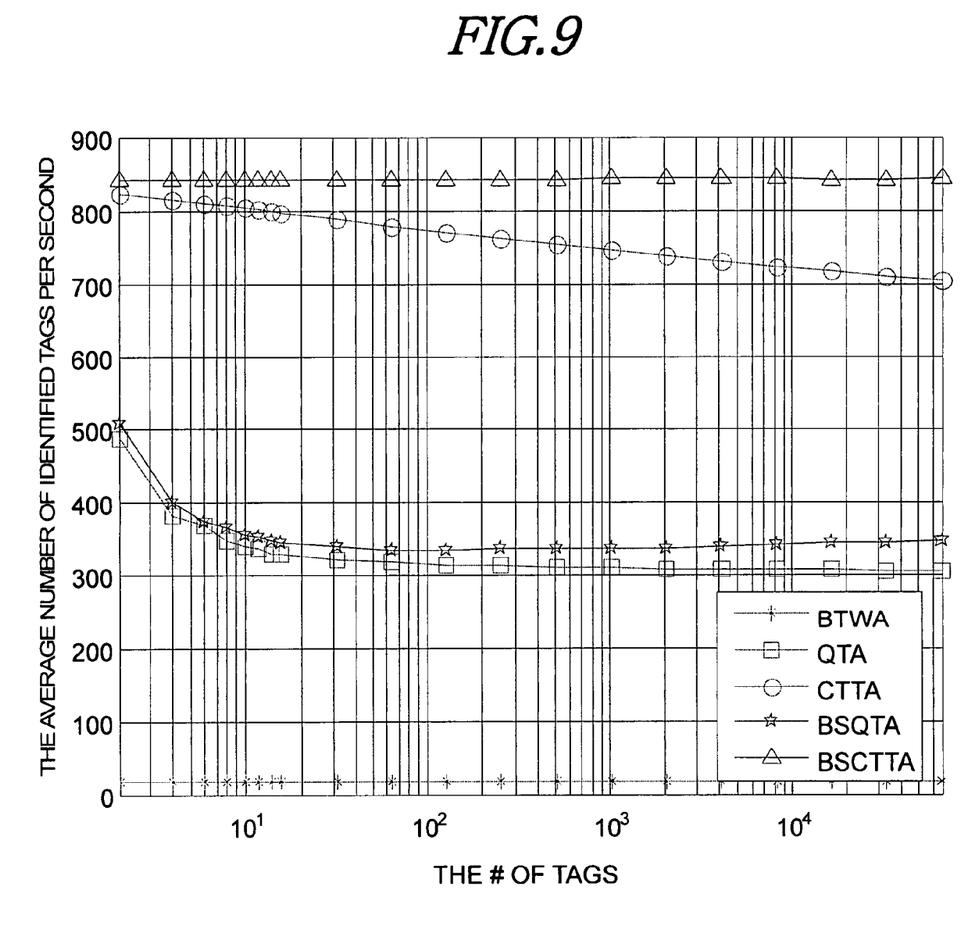
FIG. 9 shows the number of tags, each of which has a 96-bit ID, identified per unit time (second) by the reader on condition that both the reader-to-tag data rate and the tag-to-reader date rate are set to be 80 kbps in accordance with the present invention.

FIGS. 7 and 8 respectively describe the average required bits and iteration for the inquiry and the response of the reader and the tag in case of identifying one tag which has a 96-bit ID in accordance with the present invention, while FIG. 9 shows the number of tags, each of which has a 96-bit ID, identified per unit time (second) by the reader on condition that both the reader-to-tag data rate and the tag-to-reader date rate are set to be 80 kbps in accordance with the present invention.

As shown in FIG. 7, in bi-slot tree based anti-collision method of the present invention, it is noted that the reader's inquiries can be reduced to 'half–1' bits without influencing on the tags' responses compared to the conventional tree based anti-collision method. Further, as illustrated in FIG. 8, it is also noted that the average required iteration for the inquiry and the response is reduced in half.

Accordingly, as shown in FIG. 9, the performance is enhanced in terms of the number of tags which can be identified per second in accordance with the present invention compared to the conventional methods.

While the invention has been shown and described with respect to the preferred embodiments, it will be understood by those skilled in the art that various changes and modifications may be made without departing from the spirit and scope of the invention as defined in the following claims.

What is claimed is

1. A tag identification method in RFID systems including a reader and a plurality of tags, the method comprising the steps of:
    (a) transmitting an inquiry of (n−1) bits to each tag at the reader;
    (b) deciding whether the inquiry of (n−1) bits are identical with first (n−1) bits of each tag ID when receiving the inquiry of (n−1) bits at each tag within a readable range of the reader;
    (c) transmitting each tag ID by one bit from $(n+1)_{th}$ bit to last bit thereof to the reader through different time slots based on $n_{th}$ bit value of each tag ID at the tags whose first (n−1) bits are identical with the inquiry of (n−1) bits; and
    (d) at the reader, checking whether there is a collision among the tag IDs received from the tags and identifying each tag ID of the tags based on the check result,
    wherein, if it is determined that there is a collision in step (d), the method further comprises:
    detecting whether the bit where the collision occurred is the last bit of each tag ID of the tags; and if the bit is the last bit of the tag ID, identifying two tags having tag IDs that are the connection of the reader's inquiry and the first value or the second value.

2. The tag identification method in RFID systems of claim 1, wherein, in the step (c), each of the tags whose tag ID has the $n_{th}$ bit of '0' transmits the $(n+1)_{th}$ bit to the last bit of each tag ID to the reader by using a first time slot; and each of the tags whose tag ID has the $n_{th}$ bit of '1' transmit the $(n+1)_{th}$ bit to the last bit of each tag ID to the reader by using a second time slot.

3. The tag identification method in RFJD systems of claim 2, wherein each of the tags whose tag ID has the $n_{th}$ bit of the second value waits for the time of a predetermined time, the predetermined time being represented as (the length of each tag ID)−((n−1) bits)), and then transmit the $(n+1)_{th}$ bit to the last bit of each tag ID to the reader.

4. The tag identification method in RFID systems of claim 1, wherein, if the bit where the collision occurred is not the last bit, inquiry information for a next inquiry is stored in the reader.

5. The tag identification method in RFID systems of claim 4, wherein the inquiry information is formed by the connection of the inquiry bits of the reader and the bit indicated by the time slot.

6. An identification method in RFID systems including a reader and a plurality of tags, the method comprising the steps of:
 (a) transmitting an inquiry of (n−1) bits to each tag at the reader;
 (b) deciding whether the inquiry of (n−1) bits are identical with first (n−1) bits of each tag ID when receiving the inquiry of (n−1) bits at each tag within a readable range of the reader;
 (c) transmitting each tag ID by one bit from $(n+1)_{th}$ bit to a last bit to the reader through different time slots based on $n_{th}$ bit value of each tag ID at the tags each of which the first (n−1) bits are identical with the inquiry of (n−1) bits;
 (d) at the reader, checking whether there is a collision in each bit received from each tag through the different time slots and, if there occurred a collision, transmitting an ACK signal to each tag while detecting the bit where the collision occurred, the ACK signal representing the occurrence of the collision; and
 (e) identifying each tag ID of the tags base on the detection, wherein, if it is determined that there is no collision in step (d), step (d) further includes the steps of:
 detecting whether the received bit from each tag is the last bit;
 if the received bit is the last bit of the tag IDs, identifying a tag ID which is the connection of the reader's inquiry, the bit indicated by the time slot, and the received bits; and
 if the received bit is not the last bit, receiving the next bit value of each tag ID from each tag.

7. The tag identification method in RFID systems of claim 6, wherein, in the step (c), each of the tags whose tag ID has the $n_{th}$ bit of '0' transmit each tag ID by one bit from the $(n+1)_{th}$ bit to last bit to the reader by using a first time slot; and each of the tags whose tag ID has the $n_{th}$ bit of '1' transmit each tag ID by one bit from the $(n+1)_{th}$ bit to the last bit of each tag ID to the reader by using a second time slot.

8. The tag identification method in RFID systems of claim 7, wherein each of the tags whose tag ID has the $n_{th}$ bit of '1' transmit each tag ID by one bit from the $(n+1)_{th}$ bit to the last bit to the reader after receiving the ACK signal from the reader.

9. The tag identification method in RFID systems of claim 6, wherein, in the step of (e), if the bit where the collision occurred is the last bit of the tag IDs, the reader identifies two tags of which tag IDs are the connection of the reader's inquiry, the bit indicated by the second time slot, the bits received before receiving the last bit, and '0' or '1'.

10. The tag identification method in RFID systems of claim 6, wherein, in the step of (e), if the bit where the collision occurred is not the last bit, a new inquiry is stored in the reader.

11. The tag identification method in RFID systems of claim 10, wherein the inquiry is formed by connection of the inquiry bits of the reader, the bit indicated by the time slot and the bits received before the collision.

* * * * *